United States Patent
Akutsu et al.

(10) Patent No.: US 12,530,811 B2
(45) Date of Patent: Jan. 20, 2026

(54) INFORMATION COMPRESSION SYSTEM AND INFORMATION COMPRESSION METHOD

(71) Applicant: Hitachi, Ltd., Tokyo (JP)

(72) Inventors: Hiroaki Akutsu, Tokyo (JP); Katsuto Sato, Tokyo (JP); Takahiro Naruko, Tokyo (JP)

(73) Assignee: HITACHI, LTD., Tokyo (JP)

( * ) Notice: Subject to any disclaimer, the term of this patent is extended or adjusted under 35 U.S.C. 154(b) by 472 days.

(21) Appl. No.: 18/103,038

(22) Filed: Jan. 30, 2023

(65) Prior Publication Data

US 2023/0274465 A1    Aug. 31, 2023

(30) Foreign Application Priority Data

Feb. 25, 2022  (JP) .................. 2022-028562

(51) Int. Cl.
*G06T 9/00* (2006.01)

(52) U.S. Cl.
CPC .............. *G06T 9/001* (2013.01); *G06T 9/002* (2013.01)

(58) Field of Classification Search
None
See application file for complete search history.

(56) References Cited

U.S. PATENT DOCUMENTS

| | | | |
|---|---|---|---|
| 6,614,932 B1 | 9/2003 | Iwane | |
| 10,788,836 B2 * | 9/2020 | Ebrahimi Afrouzi | G05D 1/0214 |
| 10,915,793 B2 * | 2/2021 | Corral-Soto | G06V 10/454 |
| 11,069,082 B1 * | 7/2021 | Ebrahimi Afrouzi | H04N 23/56 |
| 11,435,746 B1 * | 9/2022 | Ebrahimi Afrouzi | G05D 1/0212 |
| 11,449,061 B2 * | 9/2022 | Ebrahimi Afrouzi | A47L 11/4011 |
| 11,449,063 B1 * | 9/2022 | Ebrahimi Afrouzi | G05D 1/0246 |
| 11,467,587 B2 * | 10/2022 | Ebrahimi Afrouzi | G06F 3/167 |
| 11,580,851 B2 * | 2/2023 | Tan | G06F 18/2415 |

(Continued)

FOREIGN PATENT DOCUMENTS

| | | | | |
|---|---|---|---|---|
| EP | 1043690 A2 * | 10/2000 | | G06T 1/00 |
| JP | 2000-295611 A | 10/2000 | | |
| JP | 2021-111882 A | 8/2021 | | |

OTHER PUBLICATIONS

Office Action received in JP2022-028562, dated Feb. 12, 2025, in 8 pages (with machine translation).

*Primary Examiner* — Anand P Bhatnagar
(74) *Attorney, Agent, or Firm* — Procopio, Cory, Hargreaves & Savitch LLP

(57) ABSTRACT

The present disclosure provides an information compression system that is capable of achieving higher compression efficiency. A data acquisition section acquires data. A generation section (segmentation section and integration section) determines each object depicted by the data and a sense of each object, and according to results of the determination, generates compression target data by converting values of elements in the data to identification information indicating each object and the sense of each object. A data storage section generates compressed data by compressing the compression target data. This makes it possible to convert highly random element values to slightly random identification information and compress the resulting converted information while reducing the amount of information. Consequently, the compression ratio can be increased.

14 Claims, 18 Drawing Sheets

| x | y | z | SENSE ID | INSTANCE ID |
|---|---|---|---|---|
| 0.5 | 0.6 | 0.7 | 1 | 3 |
| 0.5 | 0.7 | 0.6 | 2 | 5 |
| ... | ... | ... | ... | ... |

41 = (x, y, z); 42 = SENSE ID; 43 = INSTANCE ID

40 INTEGRATED DATA

(56) References Cited

U.S. PATENT DOCUMENTS

| | | | |
|---|---|---|---|
| 11,645,781 B2 * | 5/2023 | Li | G06V 20/00 |
| | | | 345/629 |
| 11,676,310 B2 * | 6/2023 | Huang | B60W 40/10 |
| | | | 382/100 |
| 11,727,238 B2 * | 8/2023 | Brent | G06T 7/73 |
| | | | 345/633 |
| 2015/0371431 A1 * | 12/2015 | Korb | G06V 10/60 |
| | | | 382/113 |
| 2022/0382459 A1 | 12/2022 | Akutsu et al. | |

* cited by examiner

| x | y | z |
|---|---|---|
| 0.1 | 0.2 | 0.3 | ~31
| 0.1 | 0.3 | 0.4 | ~31
| ... | ... | ... |

30a POINT CLOUD DATA

| - | HORIZONTAL AXIS | | |
|---|---|---|---|
| VERTICAL AXIS | 100 | ... | 120 |
| | ... | ... | ... |
| | 4 | ... | 93 |

30b COLOR CAMERA DATA

30 SENSOR DATA

FIG. 3

| 51 | 52 | 53 | 54 POSITION | | | 55 ORIENTATION | | | 56 SCALE | 57 FOCAL LENGTH | 58 RESOLUTION | | 59 ANGLE OF VIEW | |
|---|---|---|---|---|---|---|---|---|---|---|---|---|---|---|
| SENSOR ID | TYPE | PAIR ID | x | y | z | ψ | θ | φ | | | VERTICAL | HORIZONTAL | VERTICAL | HORIZONTAL |
| 0 | POINT CLOUD | - | | | | | | | | | | | | |
| 1 | COLOR CAMERA | 0 | | | | | | | | | | | | |

50 SENSOR INFORMATION

FIG. 5

| 61 | 62 | 63 | 64 | 65 | 66 | 67 | 68 |
|---|---|---|---|---|---|---|---|
| SENSOR ID | x | y | z | t_s | t_e | COMPRESSION STATE | COMPRESSED DATA |
|  |  |  |  |  |  |  |  |
|  |  |  |  |  |  |  |  |

60 CHUNK INFORMATION

FIG. 6

| SENSOR ID | SPATIAL RANGE (START) | | | SPATIAL RANGE (END) | | | t_s | t_e | SENSE ID | INSTANCE ID |
|---|---|---|---|---|---|---|---|---|---|---|
| | x | y | z | x | y | z | | | | |
| Any | 0.1 | 0.3 | 0.2 | 1.3 | 1.2 | 1.4 | 1/1 10:00:14 | 1/1 10:00:14 | 1,2,5 | Any |

80 DATA USAGE INTERFACE

FIG. 8

INFORMATION COMPRESSION SYSTEM AND INFORMATION COMPRESSION METHOD

CROSS-REFERENCE TO PRIOR APPLICATION

This application related to and claims the benefit of priority from Japanese Patent Application No. 2022-028562, filed Feb. 25, 2022, the entire disclosure of which is incorporated herein by reference.

BACKGROUND OF THE INVENTION

Field of the Invention

The present disclosure relates to an information compression system and an information compression method.

Description of the Related Art

In recent years, in the field, for example, of social infrastructure and mobility, sensor data such as multidimensional point cloud data and image data are acquired by using sensors such as light detection and ranging (LiDAR) sensors and cameras, and utilized for a variety of applications. However, for example, the above-mentioned field encounters a problem that the amount of sensor data becomes huge.

In view of the above circumstances, a technology for compressing multidimensional data by using a neural network is disclosed in JP-2021-111882-A. This technology is capable of achieving optimal compression regardless of the dimensionality and format of the multidimensional data.

SUMMARY OF THE INVENTION

However, the multidimensional data is compressed as is by the technology described in JP-2021-111882-A. Therefore, sufficient compression efficiency may not be achieved in some cases.

It is an object of the present disclosure to provide an information compression system and an information compression method that are capable of achieving higher compression efficiency.

According to an aspect of the present disclosure, there is provided an information compression system that compresses data and includes an acquisition section, a generation section, and a compression section. The acquisition section acquires the data. The generation section determines each object depicted by the data and a sense of each object and generates compression target data according to results of the determination. The compression target data is obtained by converting values of individual elements in the data to identification information that indicates each object and the sense of each object. The compression section generates compressed data by compressing the compression target data.

The present disclosure provides higher compression efficiency.

BRIEF DESCRIPTION OF THE DRAWINGS

FIG. 3 is a diagram illustrating an example of sensor data;

FIG. 5 is a diagram illustrating an example of sensor information;

FIG. 6 is a diagram illustrating an example of chunk information;

FIG. 8 is a diagram illustrating an example of a data usage interface;

DESCRIPTION OF THE PREFERRED EMBODIMENTS

Embodiments of the present disclosure will now be described with reference to the accompanying drawings.

First Embodiment

Figure 1:
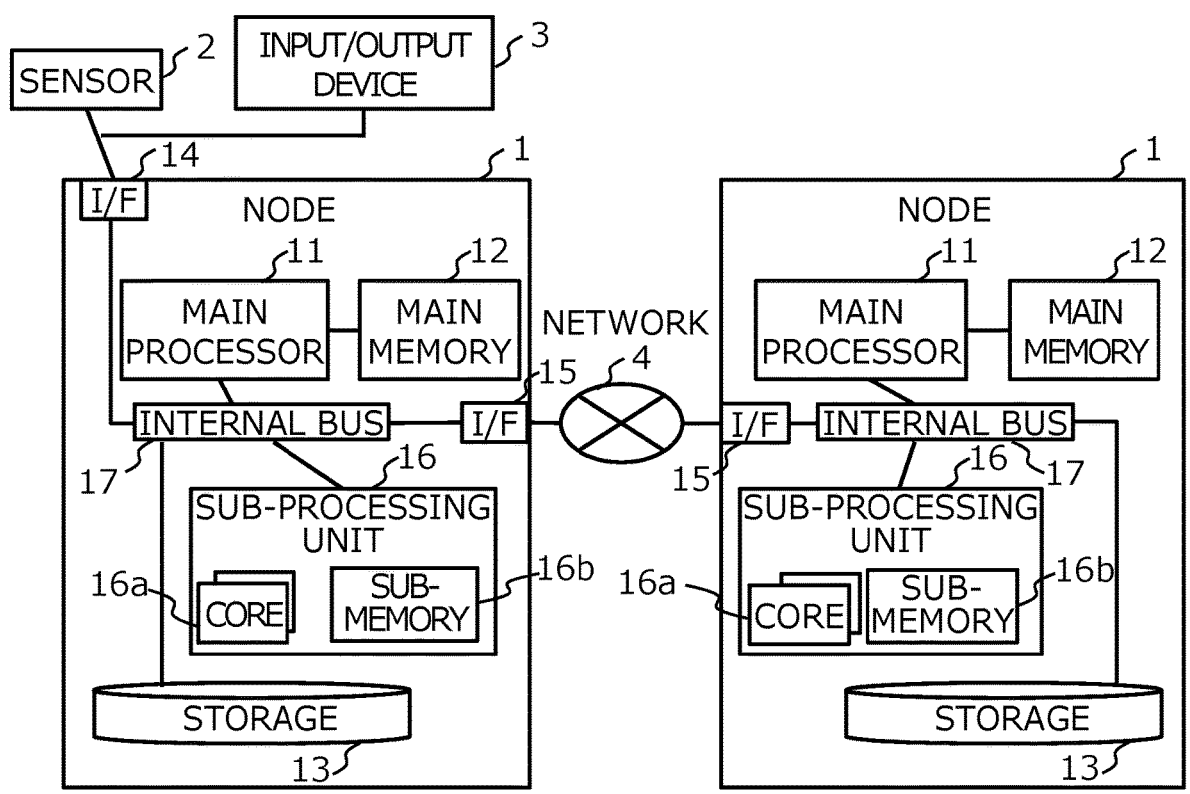
FIG. 1 is a diagram illustrating a physical configuration of an information compression system according to a first embodiment of the present disclosure.

FIG. 1 is a diagram illustrating a physical configuration of an information compression system according to a first embodiment of the present disclosure. The information compression system depicted in FIG. 1 includes a node 1. The node 1 is communicatively connected to a sensor 2 and an input/output device 3. Further, a plurality of nodes 1 may be included in the information compression system. In the case where the information compression system includes two or more nodes 1, at least one of the nodes 1 should be connected to the sensor 2 and the input/output device 3. In the example of FIG. 1, two nodes 1 are communicatively connected to each other through a network 4, with the sensor 2 connected to one of the nodes 1.

The node 1 is a computer system such as a cloud system, an on-prem system, an edge computing system, or a smartphone or other mobile equipment.

The node 1 includes a main processor 11, a main memory 12, a storage 13, interfaces (I/Fs) 14 and 15, and a sub-processing unit 16. These components are interconnected through an internal bus 17.

The main processor 11, which is, for example, a central processing unit (CPU), loads a program (computer program) into the main memory 12 from the storage 13 and executes the program to perform various processes according to the program. The main memory 12 is a storage device that is used as a work area of the program. The storage 13 is a storage device for storing, for example, the program and information used or generated by the main processor 11 and the sub-processing unit 16. The I/Fs 14 and 15 are communication devices for communicatively connecting to an external device. In FIG. 1, the I/F 14 is connected to the sensor 2, and the I/F 15 is connected to a remote node 1 through the network 4.

The sub-processing unit 16, which is, for example, a graphics processing unit (GPU), performs a predetermined process according to the program. The sub-processing unit 16 includes a plurality of cores 16a and a sub-memory 16b. The cores 16a are used to perform multiprocessing for simultaneously performing a plurality of processes. The sub-memory 16b is used as a work area by the cores 16a.

The sensor 2, which is a sensing device such as a Lidar or other optical sensor, an optical camera, or a gravity sensor, transmits detected sensor data to the node 1. Alternatively, an SD card or other recording medium storing sensor data may be used instead of the sensor 2 or in addition to the sensor 2.

The input/output device 3 includes an input device and an output device. The input device is a keyboard, a touch panel, a pointing device, or other device that receives various kinds of information from a user of the information compression system. The output device is a display device, a printer, or other device that outputs various kinds of information to the user. Alternatively, the input/output device 3 may be, for example, a mobile terminal used by the user.

Figure 2:
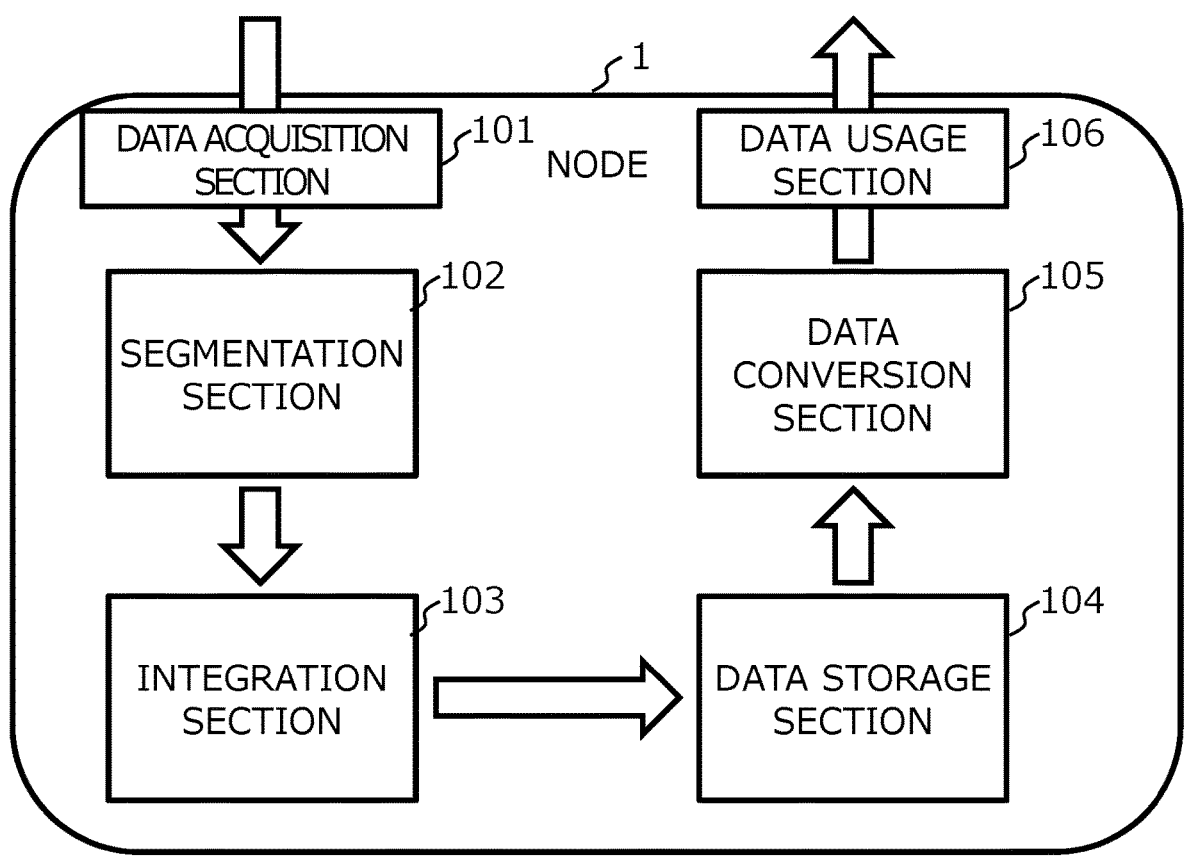
FIG. 2 is a diagram illustrating a logical configuration of a node.

FIG. 2 is a diagram illustrating a logical configuration of the node 1. As depicted in FIG. 2, the node 1 includes a data acquisition section 101, a segmentation section 102, an integration section 103, a data storage section 104, a data conversion section 105, and a data usage section 106. The individual sections 101 to 106 of the node 1 are implemented when, for example, at least either one of the main processor 11 and the sub-processing unit 16 executes the program.

The data acquisition section 101 acquires sensor data from the sensor 2. In the present embodiment, the sensor data includes point cloud data and color camera data. The point cloud data is three-dimensional data acquired by a measurement sensor such as a Lidar or time-of-flight (TOF) sensor. The color camera data is image data acquired by a color camera. The point cloud data is an aggregate of point data pieces indicating individual positions of an object surface. Each point data piece includes coordinate information indicating the coordinates of the position of the object surface. The color camera data includes pixel values of each pixel that represent color information regarding a plurality of colors (red (R), green (G), and blue (B) in the present embodiment). Further, in the present embodiment, the point cloud data and the color camera data are time-series data. More specifically, the color camera data is video data.

The data acquisition section 101 may provide the user with a data usage interface for designating the sensor data to be acquired and acquire the sensor data designated by the data usage interface. Alternatively, for example, a command or an application programming interface (API) may be used instead of the data usage interface in order to designate the sensor data to be acquired.

The segmentation section 102 determines each object depicted by the color camera data acquired by the data acquisition section 101 and the sense of each object, and generates segmentation data according to the results of the determination. The segmentation data is obtained by converting the individual pixel values of the color camera data to identification information that indicates each object and the sense of each object. The identification information includes an instance ID and a sense ID. The instance ID is the identification information for identifying the object. The sense ID is the identification information for identifying the sense of the object. It should be noted that the segmentation data may be obtained by converting at least some of the individual pixel values to the identification information.

For a segmentation process performed by the segmentation section 102, for example, a segmentation model and a management table are used. The segmentation model is a learned model for determining each object depicted by the color camera data and the sense of each object. The management table is used to define the instance ID and the sense ID. The segmentation section 102 may provide the user with a setting interface for defining the settings related to the segmentation process and perform the segmentation process according to the settings defined through the setting interface.

The integration section 103 generates integrated data based on sensor information regarding the sensor 2 by integrating the point cloud data, which is acquired by the data acquisition section 101, with the segmentation data, which indicates the result of processing performed by the segmentation section 102. More specifically, the integrated data includes coordinate information and identification information regarding each position of the object surface depicted by the color camera data. The coordinate information indicates the coordinates of the position, whereas the identification information indicates the object existing at the position. In the present embodiment, the integrated data serves as compression target data, which is to be actually compressed. The segmentation section 102 and the integration section 103 form a generation section for generating the compression target data. It should be noted that the integration section 103 uses sensor information 50 to convert the point cloud data, which is acquired by the data acquisition section 101, to a unified coordinate space (coordinate space designated by the data usage interface 80). Therefore, the data can be handled in a unified manner by the data usage interface 80. Additionally, in a case where the same object is imaged by a multi-view sensor, the amount of point cloud data, which becomes redundant, can efficiently be reduced by later-described quantization and compression processing.

The data storage section 104 functions as a compression section for generating compressed data by compressing the integrated data, which is integrated by the integration section 103, and functions as a decompression section for generating decompressed data by decompressing the compressed data.

For example, the data storage section 104 compresses the integrated data in units of data blocks called chunks. Further, the data storage section 104 may store the compressed data in the node 1, which is a local node having the data storage section 104 that has compressed the data, or may store the compressed data in a remote node 1 by transferring the compressed data to the remote node 1 other than the local node. Furthermore, the data storage section 104 reads out and decompresses the compressed data at a predetermined timing or in response to user instructions.

The data conversion section 105 converts the decompressed data, which is generated by the data storage section 104, to data in a predetermined format. For example, the data conversion section 105 converts the decompressed data to mesh data or to learning data for machine learning. Alternatively, the decompressed data may be used as is without being converted.

The data usage section 106 receives converted data, which is converted by the data conversion section 105, and supplies the converted data as output data. For example, the data usage section 106 displays the output data on the input/output device 3 or transmits the output data to the remote node 1 for the purpose, for example, of utilizing the decompressed data in a real-time manner or in a time-series manner. The decompressed data may be utilized in the real-time manner, for example, for inference or visualization and may be utilized in the time-series manner, for example, for learning or analysis.

FIG. 3 is a diagram illustrating an example of the sensor data. Sensor data 30 depicted in FIG. 3 includes point cloud data 30a and color camera data 30b.

The point cloud data 30a is an aggregate of point data pieces 31, which is coordinate information indicating positions of an object surface. Each point data piece indicates the coordinates of a position of the object surface by using a Cartesian coordinate system that is defined by the x-axis, the y-axis, and the z-axis. The x-, y-, and z-axes may be defined for each sensor 2 or broadly defined.

The color camera data 30b indicates pixel values of individual pixels that are arrayed in a matrix form in two-dimensional directions, namely, in the horizontal and vertical axis directions. The pixel values contain color information that includes a plurality of values representing a plurality of different colors (red (R), green (G), and blue (B) in the present embodiment). Therefore, the color camera data 30b may be regarded as three-dimensionally arrayed data ([3] [X] [Y]). In this case, [3] indicates the color information, [X] indicates a pixel position in the horizontal axis direction, and [Y] indicates the pixel position in the vertical axis direction. For the sake of simplicity, FIG. 3 depicts only the pixel values corresponding to a single color.

In the present embodiment, the point cloud data 30a and the color camera data 30b are time-series data. The data depicted in FIG. 3 are the point cloud data 30a and the color camera data 30b at a certain point of time.

Figure 4:
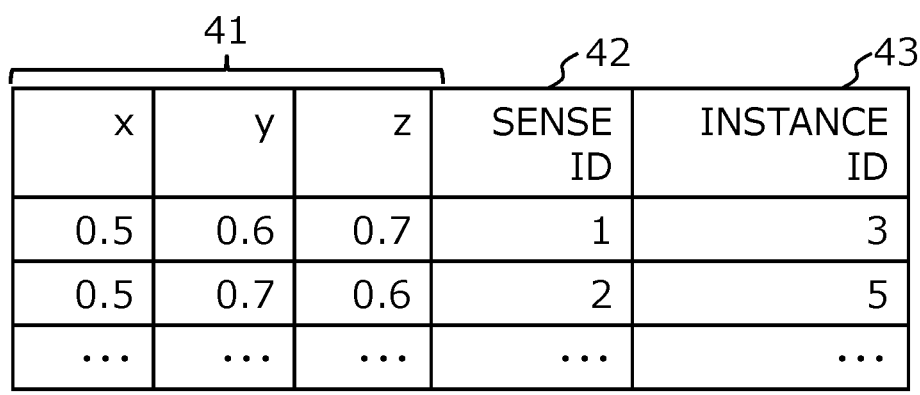
FIG. 4 is a diagram illustrating an example of integrated data.

FIG. 4 is a diagram illustrating an example of the integrated data. Integrated data 40 depicted in FIG. 4 includes fields 41 to 43. The field 41 stores the coordinate information (point data) that indicates a position of an object surface. The field 42 stores the sense ID that identifies the sense of the object existing at the position indicated by the coordinate information stored in the field 41. The field 43 stores the instance ID that identifies the object existing at the position indicated by the coordinate information stored in the field 41.

FIG. 5 is a diagram illustrating an example of the sensor information. The sensor information 50 depicted in FIG. 5 includes fields 51 to 59.

The field 51 stores a sensor ID that is identification information for identifying the sensor 2. The field 52 stores the type of the sensor 2 that is identified by the sensor ID stored in the field 51. Two types of sensors 2, namely, "point cloud" and "color camera," are described in the present embodiment. "Point cloud" corresponds to the sensor 2 (e.g., Lidar sensor) that acquires the point cloud data. "Color camera" corresponds to the sensor 2 (e.g., color camera) that acquires the color camera data. The field 53 stores a pair ID identifying a pair of sensors 2 that acquire the point cloud data and the color camera data for generating the integrated data. In the example of FIG. 5, the sensor ID of the "point cloud data" sensor 2 paired with the "color camera" sensor 2 is stored as the pair ID in the field 53 corresponding to the field 52 where "color camera" is stored as the type of sensor 2.

The field 54 stores position information that indicates the position where the sensor 2 is disposed. The position information indicates the position of the sensor 2 by using the Cartesian coordinate system with x-, y-, and z-axes. It should be noted that the coordinate axes (x-, y-, and z-axes) for defining the position of the sensor 2 need not be identical with the coordinate axes of the point cloud data depicted in FIG. 3. The field 55 stores orientation information that indicates the orientation of the sensor 2. In the example of FIG. 5, the orientation information is represented by a rotation angle $\Psi$, an elevation angle $\theta$, and an azimuth angle $\phi$. The field 56 stores a scale of the sensor 2. The field 57 stores a focal length of the sensor 2. The field 58 stores a resolution of the sensor 2. The field 59 stores an angle of view of the sensor 2.

FIG. 6 is a diagram illustrating an example of chunk information regarding a chunk that is a data block unit used for compressing the integrated data. Chunk information 60 depicted in FIG. 6 includes fields 61 to 68.

The field 61 stores the sensor ID for identifying the sensor 2 that is used to generate the integrated data to be compressed. The field 62 stores an x-direction start position of a chunk in the integrated data. The field 63 stores a y-direction start position of the chunk in the integrated data. The field 64 stores a z-direction start position of the chunk in the integrated data. The field 65 stores a start time of the chunk in the integrated data. The field 66 stores an end time of the chunk in the integrated data. The width of the chunk in each of the x-, y-, and z-directions is, for example, predesignated separately from the chunk information 60. The field 61 may alternatively store a plurality of sensor IDs for storing the information acquired from a plurality of sensors as the information regarding the same chunk.

The field 67 stores a compression state of the chunk. The compression state indicates whether the chunk is compressed or not. In the case where the chunk is compressed, the compression state additionally indicates a compression algorithm used for chunk compression. The field 68 stores the compressed data that is obtained by compressing the chunk. The compressed data includes, for example, compressed binary data, which is a compressed chunk main body, reference information indicating a management table used for chunk compression, and settings related to normalization performed at the time of compression. The reference information is, for example, a pointer pointing to the management table. The settings are, for example, the minimum and maximum values regarding each coordinate axis in a case where normalization is performed by the min-max method.

In the example of FIG. 6, the chunk is set in terms of position and time. However, the method of setting the chunk is not limited to the method depicted in the example of FIG. 6. For example, the chunk may be set in terms of at least either one of the instance ID and the sense ID.

Figure 7:
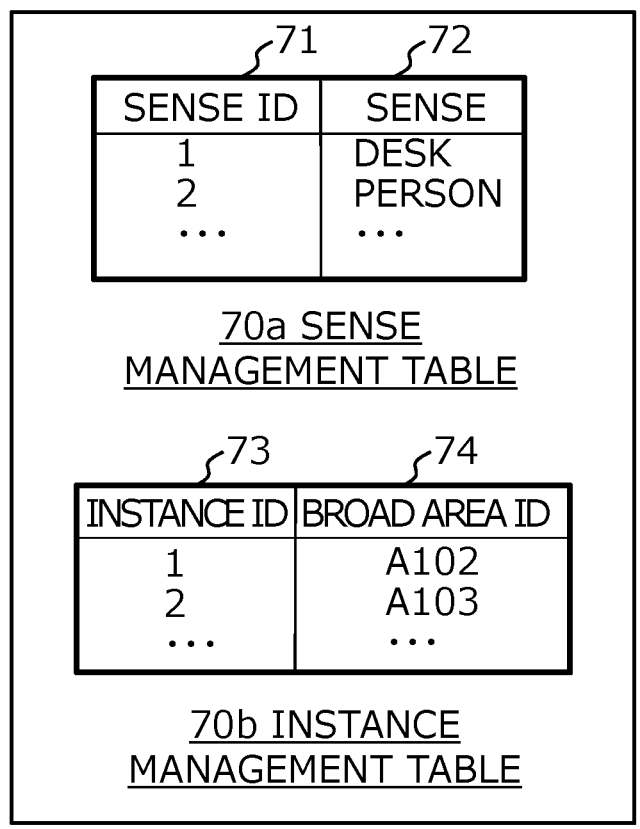
FIG. 7 is a diagram illustrating an example of a management table.

FIG. 7 is a diagram illustrating an example of the management table. A management table 70 depicted in FIG. 7 includes a sense management table 70a and an instance management table 70b.

The sense management table 70a includes fields 71 and 72. The field 71 stores the sense ID. The field 72 stores sense information that indicates the sense identified by the sense ID. In the present embodiment, the sense information indicates the type of object, such as "person" or "desk," as the sense.

The instance management table 70b includes fields 73 and 74. The field 73 stores the instance ID. The field 74 stores a broad area ID that broadly identifies the object identified by the instance ID. The instance ID is identification information for identifying an object according to a single piece of integrated data (or a single target space), whereas the broad area ID is identification information for identifying a target object according to all pieces of integrated data.

FIG. 8 is a diagram illustrating an example of the data usage interface used for reading out the output data through the data usage section 106. The data usage interface 80 depicted in FIG. 8 includes designation fields 81 to 87.

The designation field 81 is used for designating the sensor ID that identifies the sensor 2 associated with the output data to be read out. The designation field 82 is used for designating a start position in the space of the sensor data to be acquired. The designation field 83 is used for designating an end position in the space of the output data to be read out. In the example of FIG. 8, the x-, y-, and z-coordinates of the start position and the end position are designated. The designation field 84 is used for designating a start time of the output data to be read out. The designation field 85 is used for designating an end time of the output data to be read out. The designation field 86 is used for designating the sense ID that indicates the sense of the output data to be read out. The designation field 87 is used for designating the instance ID of the output data to be read out. Designating the sense ID and the instance ID results in acquiring only the output data corresponding to the designated IDs.

The designation fields 81 to 87 may be set to "Any" for designating all. Further, "real time" may be designated as the start time and the end time. When "real time" is designated in such a manner, the output data corresponding to the sensor data at the present time, which is acquired by the data acquisition section 101, is read out as a stream in real time through the data usage section 106.

Figure 9:
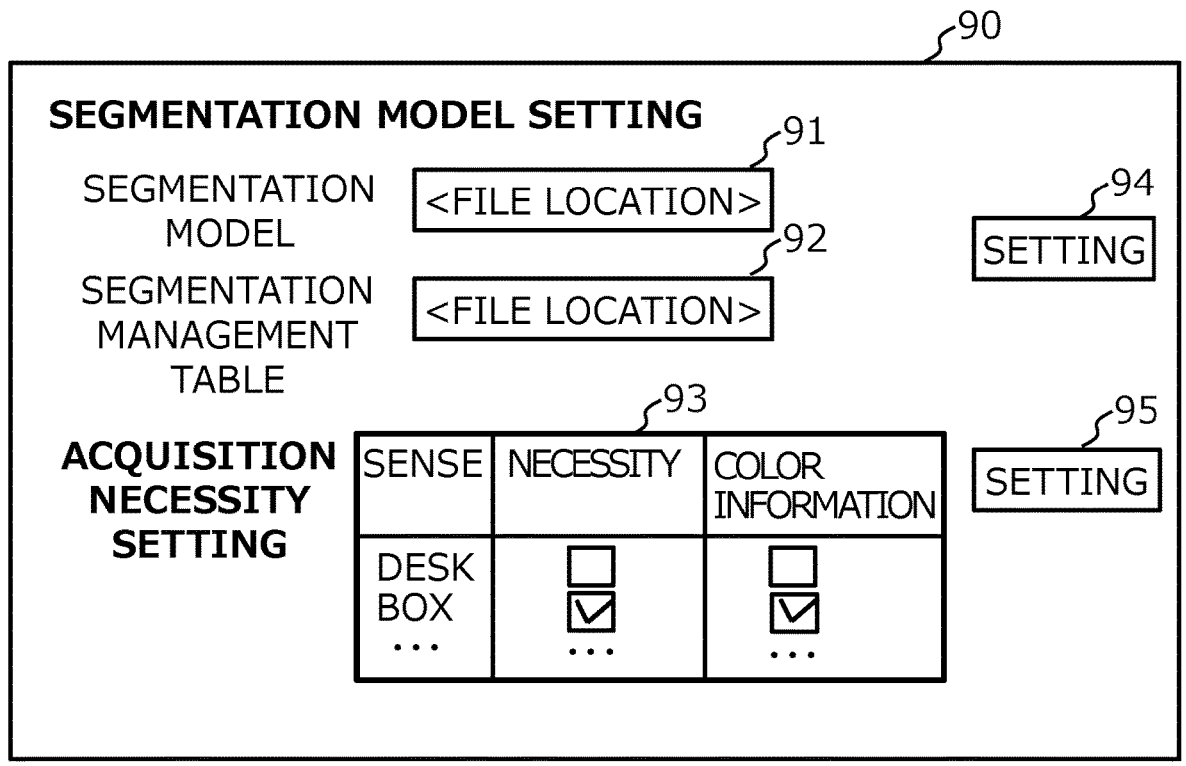
FIG. 9 is a diagram illustrating an example of a setting interface.

FIG. 9 is a diagram illustrating an example of the setting interface for defining the settings related to the segmentation process performed by the segmentation section 102. A setting interface 90 depicted in FIG. 9 includes selection fields 91 to 93 and setting buttons 94 and 95.

The selection field 91 is used for designating a storage location of the segmentation model to be used for the segmentation process. The selection field 92 is used for designating a storage location of the management table to be used for the segmentation process. The selection field 93 is used for describing the conversion of the color camera data to the segmentation data in the segmentation process and specifying whether data acquisition is necessary. More specifically, the selection field 93 is used for defining the sense of the object targeted for data acquisition and specifying whether the pixel values of the relevant pixel are to be converted to the identification information or left unchanged and used as the color information. For example, when the sense "desk" is set as unnecessary, a data portion determined as "desk" in the result of segmentation is deleted and will not be stored. This function suppresses the acquisition of unnecessary data and saves the storage capacity.

The setting button 94 is used for setting the segmentation model and the management table. When pressed, the setting button 94 sets the segmentation model and the management table that are stored in the storage locations designated in the selection fields 91 and 92. The setting button 95 is used for setting the conversion description. When pressed, the setting button 95 sets the conversion description.

Using the setting interface makes it possible to delete the color information with respect to a "person" or other object having a specific sense, and substitute the sense ID and the instance ID for the deleted color information. This provides privacy protection.

Figure 10:
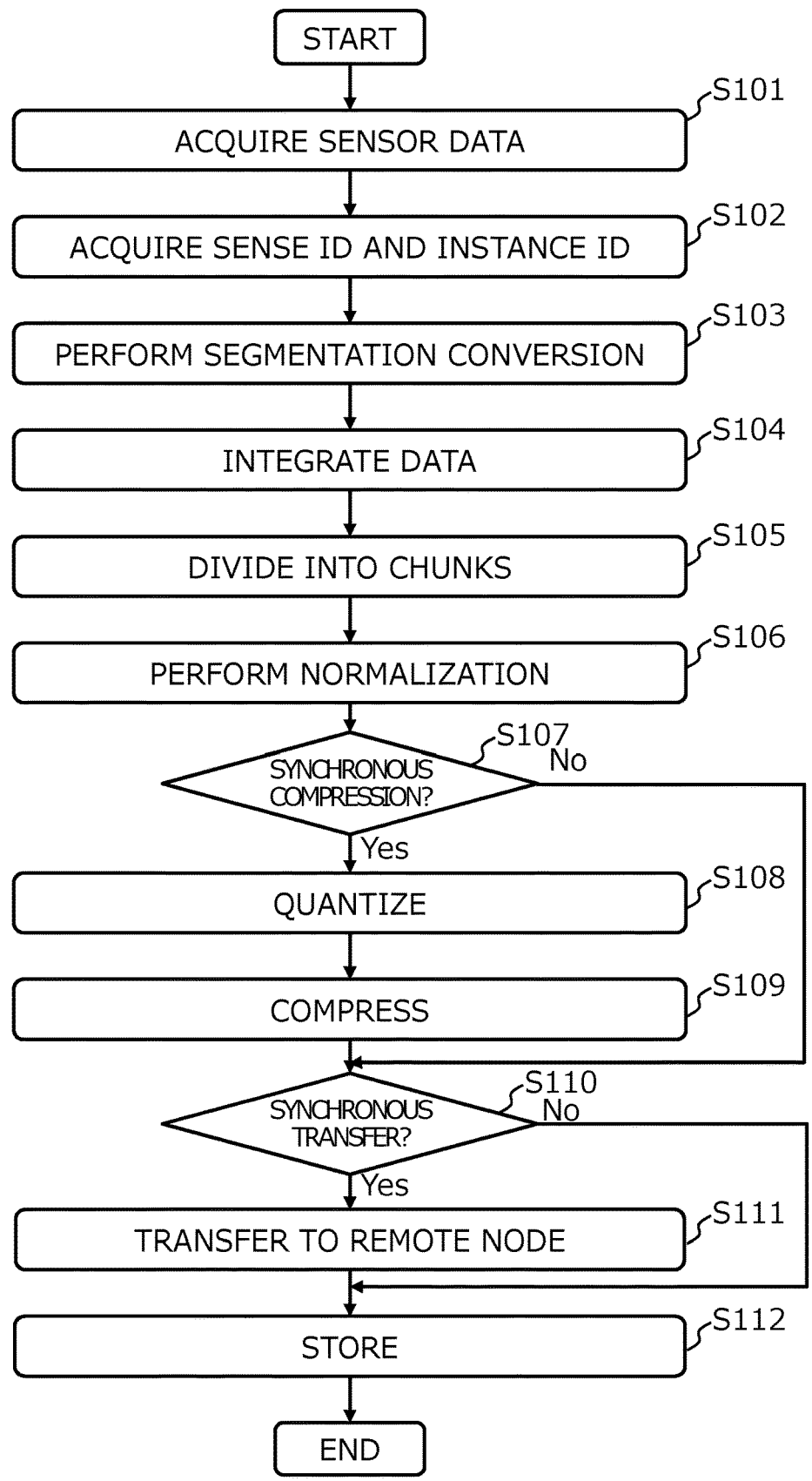
FIG. 10 is a flowchart illustrating an example of a write process.

FIG. 10 is a flowchart illustrating an example of a write process that is performed to compress and store the sensor data.

In the write process, first of all, the data acquisition section 101 acquires the sensor data from the sensor 2 (step S101). The acquired sensor data includes the point cloud data and the color camera data.

The segmentation section 102 analyzes the color camera data in the sensor data, which is acquired by the data acquisition section 101, by using the segmentation model and the management table set by the setting interface, and thus determines the object depicted by the color camera data and the sense of the object. Then, the segmentation section 102 acquires the instance ID, which is the identification information for identifying the determined object, and the sense ID, which is the identification information for identifying the sense of the object (step S102).

The segmentation section 102 converts the color camera data to the segmentation data, according to the conversion description set by the setting interface 90 (step S103). As a result, filtering is performed in such a manner that only pixels depicting the object having the sense set by the setting interface 90 remain in the segmentation data as the identification information or the color information.

The integration section 103 generates the integrated data according to the sensor information by integrating the point cloud data and the segmentation data, which correspond to each other (step S104). In a case where the point cloud data and the color camera data are acquired here as the sensor data, the integration section 103 generates the integrated data by giving the identification information to the coordinate points of the point cloud data corresponding to spatial positions of the pixels in the segmentation data. Further, even in a case where the data acquisition section 101 does not acquire the point cloud data, there is a way to generate the integrated data. More specifically, the integration section 103 may acquire the segmentation data from the color camera data, calculate a depth map (the distance between the sensor and the object corresponding to the pixels) by a common method such as the depth estimation method, and calculate the coordinate points in the space from the calculated depth map. This enables the integration section 103 to acquire information similar to the point cloud data, and similarly generate the integrated data having the information regarding the coordinate points by using the acquired similar information.

The data storage section 104 divides the integrated data, which is generated by the integration section 103, into a plurality of chunk data pieces, and generates the chunk information regarding each chunk data piece (step S105).

The data storage section 104 normalizes each chunk data piece (step S106). Here, the data storage section 104 normalizes each chunk data piece by the min-max method.

The data storage section 104 determines at this timing whether or not to perform synchronous compression for compressing the chunk data pieces (step S107). It should be noted that whether or not to perform synchronous compression is, for example, preset.

In the case where synchronous compression is to be performed ("YES" at step S107), the data storage section 104 performs quantization on each chunk data piece (step S108). Here, the quantization is, for example, a process of dividing the point cloud data expressed by floating point coordinates by a value called a quantization width, and converting the resultant to an integer through an operation based, for example, on the ROUND function. At the time of normalization, quantization granularity can be adjusted by using the quantization width. For example, in the case of the point cloud, duplicated identical coordinate points may arise after quantization. Therefore, data volume reduction can efficiently be achieved by deleting such duplicated identical coordinate points. Here, the sub-processing unit 16 is able to rapidly execute the deletion of the duplicated identical coordinate points, for example, by using the UNIQUE function, which eliminates duplicated elements in a machine learning processing system. Further, decreasing the quantization granularity causes a decrease in accuracy as well as the amount of data, whereas increasing the quantization granularity causes an increase in the accuracy as well as the amount of data. That is, the balance between the amount of data and the accuracy of coordinates can be adjusted by the quantization granularity (quantization width). Moreover, when the sensor data pieces obtained by imaging the same target object from a plurality of points of view are simultaneously processed, more duplicated elements can efficiently be eliminated by the above-described quantization and deletion of identical coordinate points. Therefore, total data volume can efficiently be reduced. Subsequently, the data storage section 104 generates the compressed data, which is obtained by compressing each quantized chunk data piece, as target data (step S109). Meanwhile, in the case where synchronous compression is not to be performed ("NO" at step S107), the data storage section 104 skips steps S108 and S109 and regards the chunk data piece as the target data.

Subsequently, the data storage section 104 determines at this timing whether or not to perform synchronous transfer for transferring each target data to the remote node (step S110). It should be noted that whether or not to perform synchronous transfer is, for example, preset.

In the case where the synchronous transfer is to be performed ("YES" at step S110), the data storage section 104 transfers the target data to the remote node 1 (step S111). Subsequently, upon receiving the target data, the data storage section 104 in the remote node 1 stores the received target data (step S112), and terminates the write process. Meanwhile, in the case where the synchronous transfer is not to be performed ("NO" at step S110), the data storage section 104 skips step S111, then stores the target data in the local node 1 (step S112), and terminates the write process.

The individual steps (steps S101 to S112) of the above-described write process may be performed by separate nodes 1. In such a case, a transfer process of transferring data to a remote node 1 is performed between the individual steps. Further, each chunk data piece that is not synchronously compressed may also be compressed at an appropriate timing. Furthermore, the target data that is not synchronously transferred may also be transferred to the remote node 1 at an appropriate timing.

Figure 11:
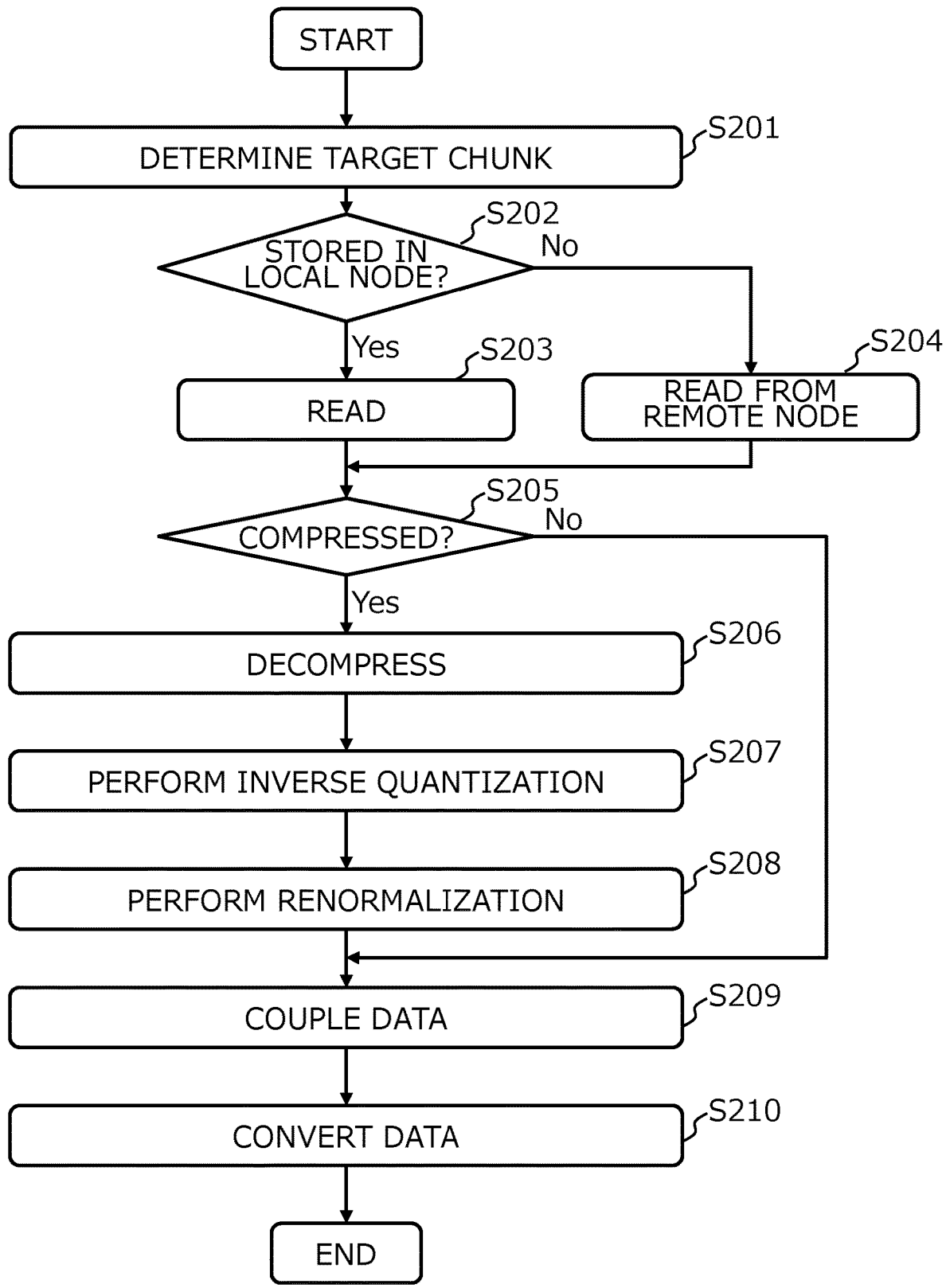
FIG. 11 is a flowchart illustrating an example of a read process.

FIG. 11 is a flowchart illustrating an example of a read process that is performed to decompress and output the compressed data.

In the read process, the data storage section 104 determines a chunk data piece targeted for decompression as the target chunk data (step S201). For example, the data usage section 106 provides the user with the data usage interface and allows the user to designate the chunk data piece targeted for decompression, whereas the data storage section 104 determines the user-designated chunk data piece as the target chunk data.

The data storage section 104 determines whether or not the target chunk data is stored in the local node (step S202).

In the case where the target chunk data is stored in the local node ("YES" at step S202), the data storage section 104 reads the target chunk data (step S203). Meanwhile, in the case where the target chunk data is not stored in the local node ("NO" at step S202), the data storage section 104 reads the target chunk data from a remote node 1 where the target chunk data is stored (step S204).

Subsequently, the data storage section 104 determines whether or not the read target chunk data is compressed (step S205).

In the case where the target chunk data is compressed ("YES" at step S205), the data storage section 104 decompresses the target chunk data (step S206). The data storage section 104 performs inverse quantization on the decompressed target chunk data (step S207), and then performs renormalization (step S208). Here, the inverse quantization is a process of returning to an original scale value by multiplying the target chunk data by the quantization width used for compression. In the case where the target chunk data is not compressed ("NO" at step S205), the data storage section 104 skips steps S206 to S208.

Subsequently, the data storage section 104 couples the target chunk data together to generate the decompressed data (step S209). It should be noted that the decompressed data is the integrated data in a case where the chunk data is lossless compressed.

The data conversion section 105 converts the decompressed data, which is generated by the data storage section 104, to data in a predetermined format, then outputs the resulting converted data (step S210), and terminates the read process.

The individual steps (steps S201 to S210) of the above-described read process may be performed by separate nodes 1. In such a case, a transfer process of transferring data to a remote node 1 is performed between the individual steps.

Figure 12:
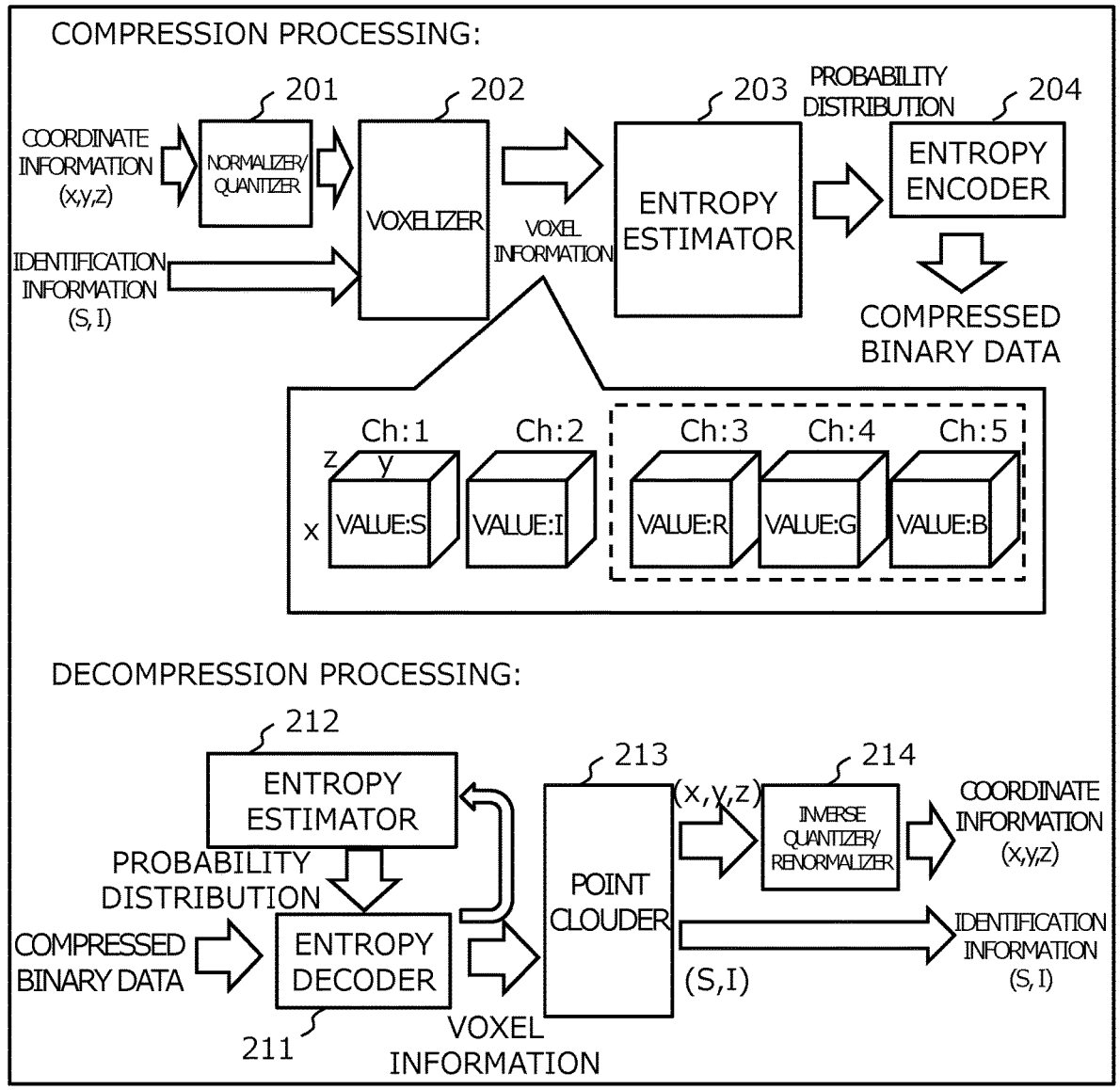
FIG. 12 is a diagram illustrating an example configuration of a data storage section according to the first embodiment of the present disclosure.

FIG. 12 is a diagram illustrating a configuration of the data storage section 104 in greater detail. The data storage section 104 includes a normalizer/quantizer 201, a voxelizer 202, an entropy estimator 203, and an entropy encoder 204 as compression processing components, and includes an entropy decoder 211, an entropy estimator 212, a point clouder 213, and an inverse quantizer/renormalizer 214 as decompression processing components. The entropy estimators 203 and 212 may have the same configuration.

In the compression processing, first of all, the normalizer/quantizer 201 performs normalization and quantization on the coordinate information in the chunk data. The normalization and the quantization are performed on each of the coordinate axes (x-, y-, and z-axes) defining the three-dimensional space.

Subsequently, the voxelizer 202 generates voxel information by voxelizing the quantized chunk data, which is obtained by normalizing and quantizing the coordinate information. More specifically, the voxelizer 202 divides the chunk data into a plurality of voxels, which are three-dimensional regions having a predetermined volume, and sets the value of each voxel according to the identification information (sense ID and instance ID) corresponding to the individual coordinates contained in the voxel. More specifically, the value of each voxel is represented by the sense ID and instance ID that correspond to the individual coordinates contained in the voxel and that are greatest in number. As a result, the chunk data is converted to the voxel information, which is an aggregate of a voxel Ch1 and a voxel Ch2. The voxel Ch1 has a value representing the sense ID (S). The voxel Ch2 has a value representing the instance ID (I).

In a case where the color information, instead of the sense ID and the instance ID, corresponds to the individual coordinate information, the voxel information is an aggregate of a voxel Ch3, a voxel Ch4, and a voxel Ch5. The voxel Ch3 has a value representing a red color (R). The voxel Ch4 has a value representing a green color (G). The voxel Ch5 has a value representing a blue color (B). Further, each voxel may be represented by an octree.

The entropy estimator 203 estimates entropy of the voxel information. Here, the entropy estimator 203 estimates, as the entropy, probability distribution indicating an appearance probability of each symbol that is capable of representing the value of the voxel information (hereinafter may be referred to simply as the probability distribution). The entropy estimator 203 is built, for example, by a learned model based on the use of a deep neural network (DNN) such as a multilayer three-dimensional convolutional neural network (CNN). The entropy estimator 203 may input low-resolution voxel information and estimate the probability distribution of high-resolution voxel information. In this case, the voxel information having different resolutions may be inputted to the entropy estimator 203 to gradually estimate the probability distribution for the purpose of providing improved prediction accuracy and various kinds of resolution decoding (generally called progressive decoding). Further, for the purpose of estimation accuracy improvement, highly similar past voxel information or statistically processed voxel information (e.g., voxel information processed to determine the median, mean, or variance of a predetermined period) may be inputted when the time-series data is handled. Further, for the purpose of estimation accuracy improvement, the probability distribution of a symbol targeted for estimation may be estimated by using the multilayer three-dimensional CNN as an autoregressive model and inputting the symbol value of known voxel information, for example, in the vicinity of the estimation target, to the entropy estimator 203. Moreover, increased efficiency may be achieved, for example, by matching the data resolutions of a plurality of data inputs to the entropy estimator 203, which relate to the above-mentioned methods, coupling the resulting data pieces having the matched resolution, and inputting the coupled data to a multilayer three-dimensional CNN channel.

Subsequently, the entropy encoder 204 generates the compressed binary data by encoding the voxel information according to the probability distribution estimated by the entropy estimator 203.

Further, in decompression processing, the entropy decoder 211 generates the voxel information by decoding the compressed binary data. More specifically, the entropy decoder 211 uses the entropy estimator 212 to predict the probability distribution of a voxel value (symbol), uses the compressed binary data and the predicted probability distribution to decode the symbol, and finally decodes it as the voxel information. In order to obtain the estimation result indicating the same probability distribution as at the time of encoding, the same entropy estimator as the entropy estimator 203 is used as the entropy estimator 212. Further, the input to the entropy estimator 212 is the same as the input to the entropy estimator 203 at the time of encoding. Moreover, in the case where the probability distribution is estimated gradually at different resolutions at the time of compression or estimated based on the autoregressive model, probability distribution estimation by the entropy estimator 212 and voxel information decoding by the entropy decoder 211 are repeated multiple times to perform decoding to generate the final voxel information.

The point clouder 213 converts the voxel information, which is generated by the entropy decoder 211, to the quantized chunk data having the coordinate information and the identification information. The inverse quantizer/renormalizer 214 generates the chunk data, which serves as the decompressed data, by performing inverse quantization and renormalization on the coordinate information regarding the quantized chunk data, which is generated by conversion performed by the point clouder 213.

As described above, according to the present embodiment, the data acquisition section 101 acquires the color camera data. The generation section (segmentation section 102 and integration section 103) determines each object depicted by the color camera data and the sense of each object, and according to the results of the determination, generates the compression target data by converting the pixel values of the color camera data to the identification information indicating each object and the sense of each object. The data storage section 104 generates the compressed data, which is obtained by compressing the compression target data. This makes it possible to convert highly random pixel values to slightly random identification information and achieve compression while reducing the amount of information. Consequently, the compression ratio can be increased.

Moreover, in the present embodiment, the data acquisition section 101 further acquires the point cloud data including a plurality of pieces of coordinate information indicating the individual positions of the object surface, and the generation section generates, as the compression target data, the integrated data that includes the coordinate information regarding each position of the object surface and the identification information identifying the object existing at the position indicated by the coordinate information. Therefore, the compression ratio can further be increased. Additionally, the data acquisition section 101 may acquire, for example, three-dimensional voxel data having height, width, and depth as well as two-dimensional image data having height and width. In such a case, segmentation conversion is performed on the three-dimensional voxel data, and subsequent processing may be performed on the three-dimensional voxel data.

Further, in the present embodiment, the data storage section 104 converts the compression target data to data obtained by normalizing and quantizing the coordinate information included in the compression target data, and then compresses the resulting converted data. This makes it possible to increase the compression ratio and compress the identification information as is. Consequently, the values representing the identification information can be prevented from being changed by quantization.

Second Embodiment

Figure 13:
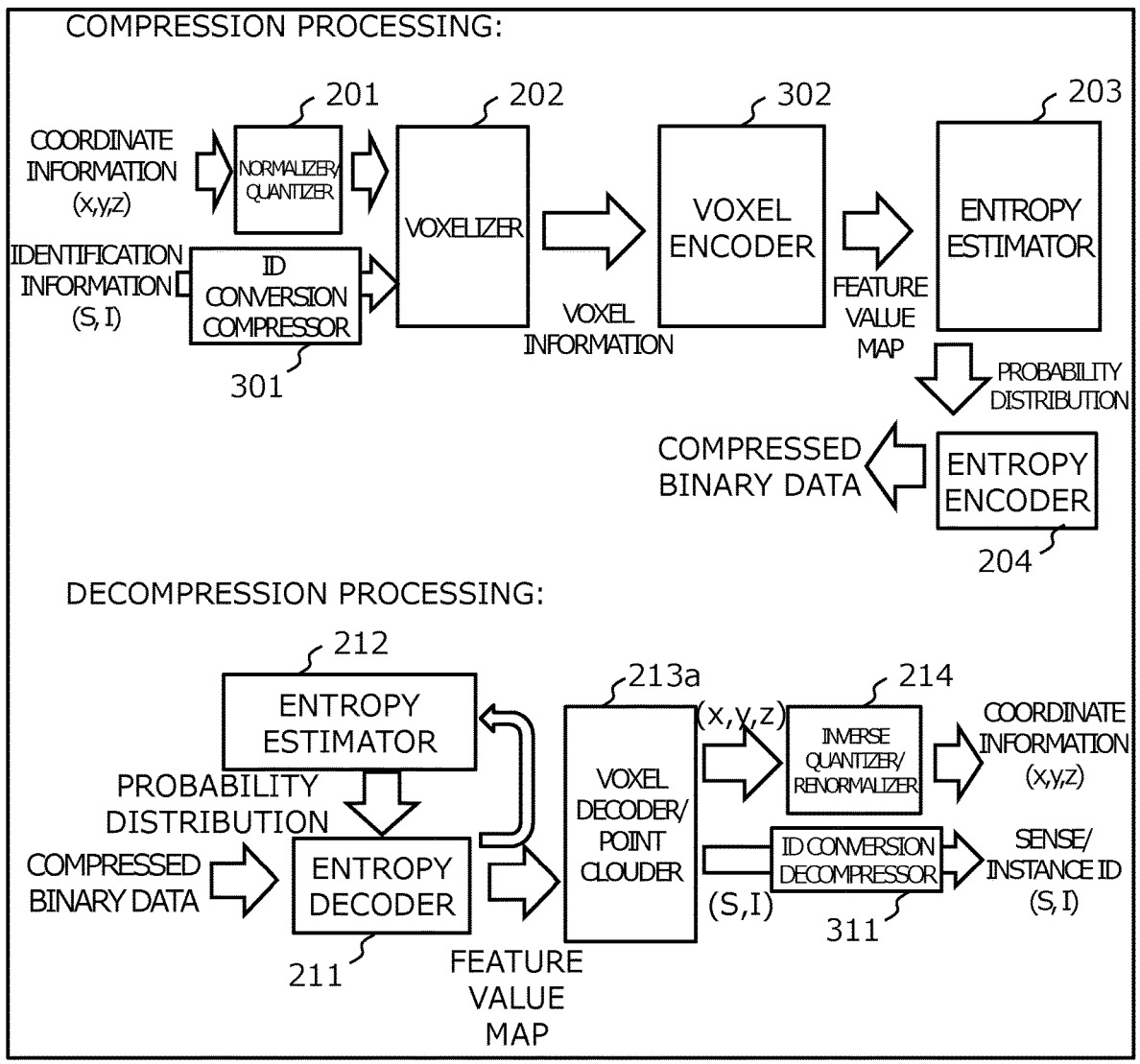
FIG. 13 is a diagram illustrating an example configuration of the data storage section according to a second embodiment of the present disclosure.

FIG. 13 is a diagram illustrating an example configuration of the data storage section 104 included in the information compression system according to a second embodiment of the present disclosure. The data storage section 104 depicted in FIG. 13 includes, as compression processing components, an ID conversion compressor 301 and a voxel encoder 302 in addition to the components depicted in FIG. 12, and includes, as decompression processing components, an ID conversion decompressor 311 in addition to the components depicted in FIG. 12, and a voxel decoder/point clouder 213a in place of the point clouder 213.

In the compression processing, the ID conversion compressor 301 replaces the values representing the identification information according to the object and the similarity of sense, which are indicated by the identification information. The ID conversion compressor 301 is built, for example, by a learned model based on the use of the DNN.

Figure 14A:
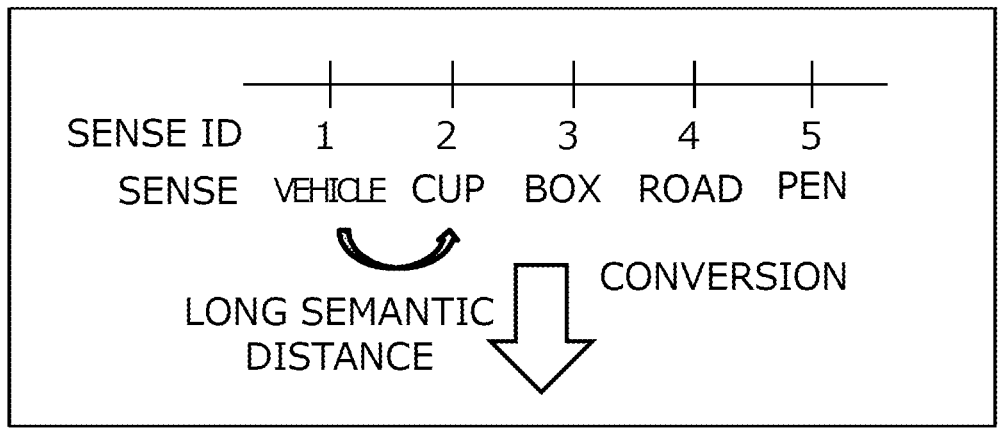
FIGS. 14A and 14B are diagrams illustrating a conversion process performed by an identification (ID) conversion compressor.
Figure 14B:
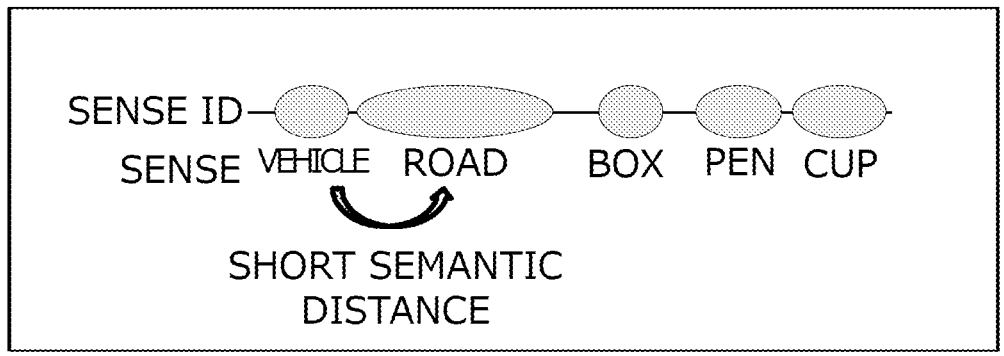

FIGS. 14A and 14B are diagrams illustrating a conversion process performed by the ID conversion compressor 301. As depicted in FIG. 14A, the "sense," which is usually identified by the sense ID, is set independently of the value of the sense ID. Therefore, the distance between sense ID values is independent of the similarity of "sense" (semantic distance). Consequently, if the sense ID is compressed as is, the "sense" after decompression might significantly be changed from the "sense" before compression due to a sense ID value shift by compression.

Accordingly, the ID conversion compressor 301 converts the sense ID values according to the sense as depicted in FIG. 14B. For example, the ID conversion compressor 301 performs conversion in such a manner that the sense ID values close to each other in semantic distance, such as "vehicle" and "road," approximate to each other.

FIGS. 14A and 14B use integers as the sense ID values before conversion. The sense ID values after conversion are not limited to integers. Further, the sense ID values after conversion may have a width. For example, in a case where the value of a sense ID is within a range of 0.5 to 1.1, the sense ID may represent a "vehicle" as its sense. Further, although FIGS. 14A and 14B illustrate sense IDs, the ID conversion compressor 301 may additionally convert instance IDs in the same manner as for the sense IDs.

Returning to FIG. 13, the voxel encoder 302 quantizes the voxel information generated by the voxelizer 202 and converts the quantized voxel information to a feature value map by encoding the quantized voxel information through irreversible conversion. The voxel encoder 302 is built by a learned model based on the use of the DNN such as a CNN. Further, the most frequent value representing the identification information included within a range of such quantization is selected as a quantized voxel value.

The entropy estimator 203 estimates the probability distribution as the entropy of the feature value map generated by the voxel encoder 302. The entropy encoder 204 generates the compressed binary data by encoding the feature value map according to the estimated probability distribution.

In the decompression processing, the entropy decoder 211 generates the feature value map by decoding the compressed binary data. The voxel decoder/point clouder 213a generates the voxel information by decoding the feature value map generated by the entropy decoder 211, and converts the generated voxel information to the quantized chunk data that includes the coordinate information and the identification information.

The inverse quantizer/renormalizer 214 inverse-quantizes and renormalizes the coordinate information regarding the quantized chunk data. The ID conversion decompressor 311 generates the chunk data, which serves as the decompressed data, by performing inverse conversion, which is the inverse of conversion performed by the ID conversion compressor 301, on the ID information regarding the quantized chunk data.

As described above, according to the present embodiment, the identification information is compressed after the value representing the identification information is replaced according to the similarity of sense. Therefore, even when the identification information is irreversibly compressed, it is possible to suppress a shift in the sense. Consequently, the compression ratio can be increased.

Third Embodiment

Figure 15:
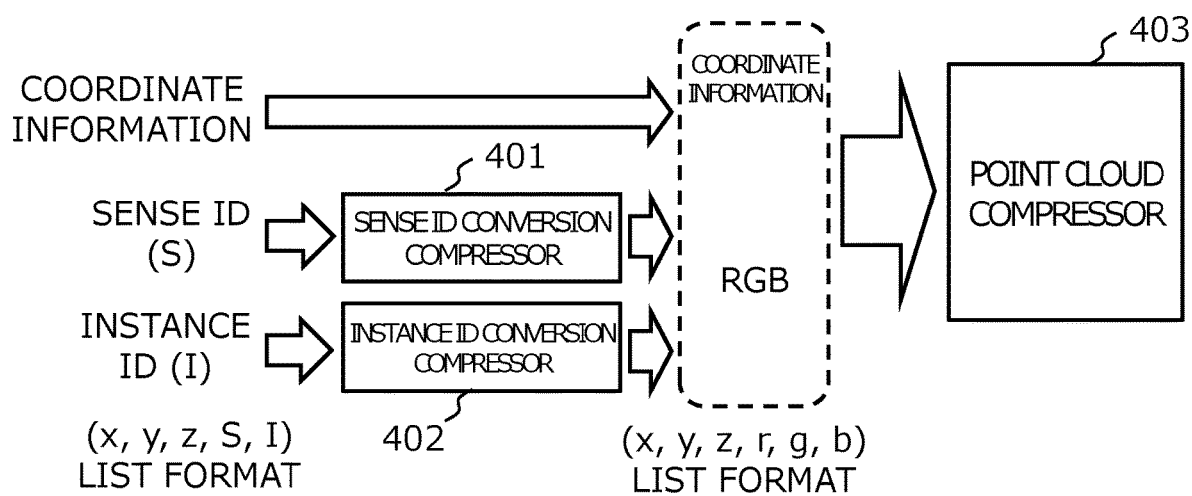
FIG. 15 is a diagram illustrating an example configuration of the data storage section according to a third embodiment of the present disclosure.

FIG. 15 is a diagram illustrating a configuration of the data storage section 104 included in the information compression system according to a third embodiment of the present disclosure. The data storage section 104 depicted in FIG. 15 includes a sense ID conversion compressor 401, an instance ID conversion compressor 402, and a point cloud compressor 403 as compression processing components.

In the present embodiment, the data storage section 104 processes each chunk data piece in the compression target data as list format data (x, y, z, S, I) that includes the coordinate information (x, y, z) and the identification information (S, I) as components.

The sense ID conversion compressor 401 and the instance ID conversion compressor 402 form an ID color converter that converts the identification information (S, I) to color information format information (R, G, B). Therefore, the list format data (x, y, z, S, I) is converted to list format data (x, y, z, R, G, B) that uses the color information. The color information (R, G, B) included in the list format data (x, y, z, R, G, B) is obtained by converting the identification information (S, I). Consequently, unlike the color information included in the original color camera data, the color information (R, G, B) included in the list format data (x, y, z, R, G, B) can reduce randomness and increase the compression ratio.

The point cloud compressor 403 generates the compressed binary data that is obtained by compressing the list format information (x, y, z, R, G, B) as point cloud data having color information. An existing compressor for compressing the point cloud data may be used as the point cloud compressor 403.

The data storage section 104 includes, as decompression processing components, for example, a point cloud decompressor for generating decompressed data by decompressing the compressed binary data generated by the point cloud compressor 403, and a color ID converter for generating the list format data (x, y, z, S, I) by inversely converting the identification information regarding the decompressed data generated by the point cloud decompressor (neither of these decompression processing components are depicted in FIG. 15).

Further, the above description assumes that the sensor data includes the point cloud data and the color camera data. However, the point cloud data need not always be included in the sensor data. In the case where the point cloud data is not included in the sensor data, for example, the data acquisition section 101 may acquire the point cloud data from the color camera data by analyzing the color camera data and estimating the positions of the object surface or may compress the sensor data without using the point cloud data.

Figure 16:
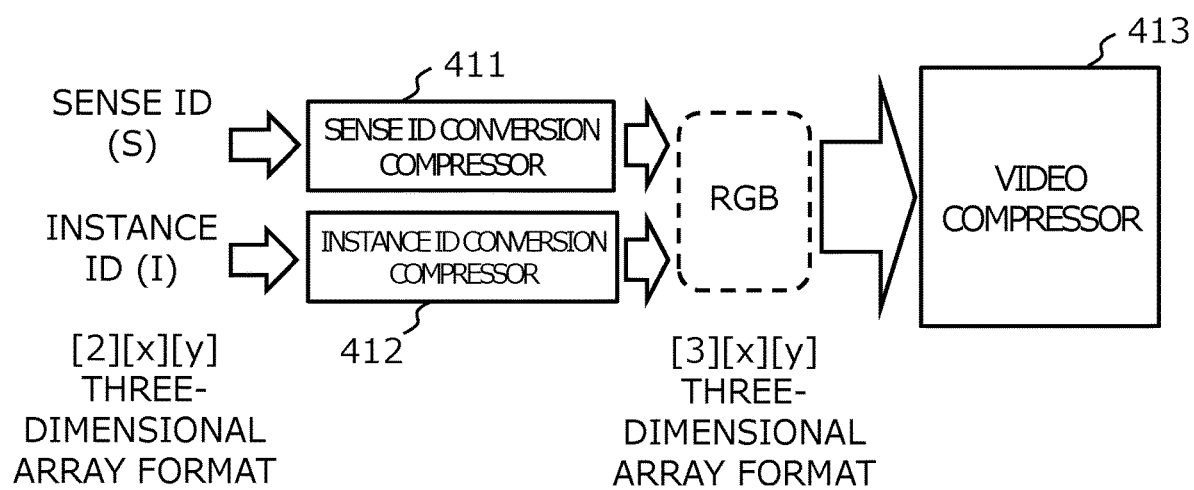
FIG. 16 is a diagram illustrating another example configuration of the data storage section according to the third embodiment of the present disclosure.

FIG. 16 is a diagram illustrating an example configuration of the data storage section 104 in a situation where the sensor data is to be compressed without using the point cloud data. The data storage section 104 depicted in FIG. 16 includes a sense ID conversion compressor 411, an instance ID conversion compressor 412, and a video compressor 413 as compression processing components.

In the example of FIG. 16, the data storage section 104 regards each chunk data piece in the compression target data as three-dimensionally arrayed data ([2] [x] [y]) that represents the identification information (S, I), the pixel position in the horizontal axis direction, and the pixel position in the vertical axis direction. Here, [2] represents the identification information, [x] represents the pixel position in the horizontal axis direction, and [y] represents the pixel position in the vertical axis direction.

The sense ID conversion compressor 411 and the instance ID conversion compressor 412 form an ID color converter that converts the identification information (S, I) to color information format information (R, G, B). Therefore, the three-dimensionally arrayed data ([2] [x] [y]) is converted to three-dimensionally arrayed data ([3] [x] [y]) that uses the color information. The color information [3] included in the three-dimensionally arrayed data ([3] [x] [y]) is obtained by converting the identification information (S, I). Consequently, unlike the color information included in the original color camera data, the color information [3] included in the three-dimensionally arrayed data ([3] [x] [y]) can reduce the randomness and increase the compression ratio.

The video compressor 413 compresses information in a three-dimensional array ([3] [x] [y]) as image data (more specifically, video data). An existing compressor for compressing a video may be used as the video compressor 413.

The data storage section 104 includes, as decompression processing components, for example, a video decompressor for generating decompressed data by decompressing the compressed binary data generated by the video compressor 413, and a color ID converter for generating the three-dimensionally arrayed data ([2] [x] [y]) by inversely converting the identification information regarding the decompressed data generated by the video decompressor (neither of these decompression processing components are depicted in FIG. 16).

In the case where the configuration depicted in FIG. 16 is adopted, the processing by the integration section 103 is omitted. Further, in the case where the configuration depicted in FIG. 16 is adopted, a spatial range of data to be decompressed is designated, for example, by specifying the sensor. Alternatively, the spatial range of the data to be decompressed may be designated by specifying the position. In such a case, the sensor ID is determined from the specified position according to a sensor information table.

As described above, in the present embodiment, the compression target data is compressed after being converted to the list format data or three-dimensionally arrayed data that includes the color information. Therefore, the efficiency of compression can be increased by using an existing compressor. Further, the point cloud data can be acquired from the image data. This eliminates the necessity of using, for example, a sensor for acquiring the point cloud data.

Fourth Embodiment

Figure 17:
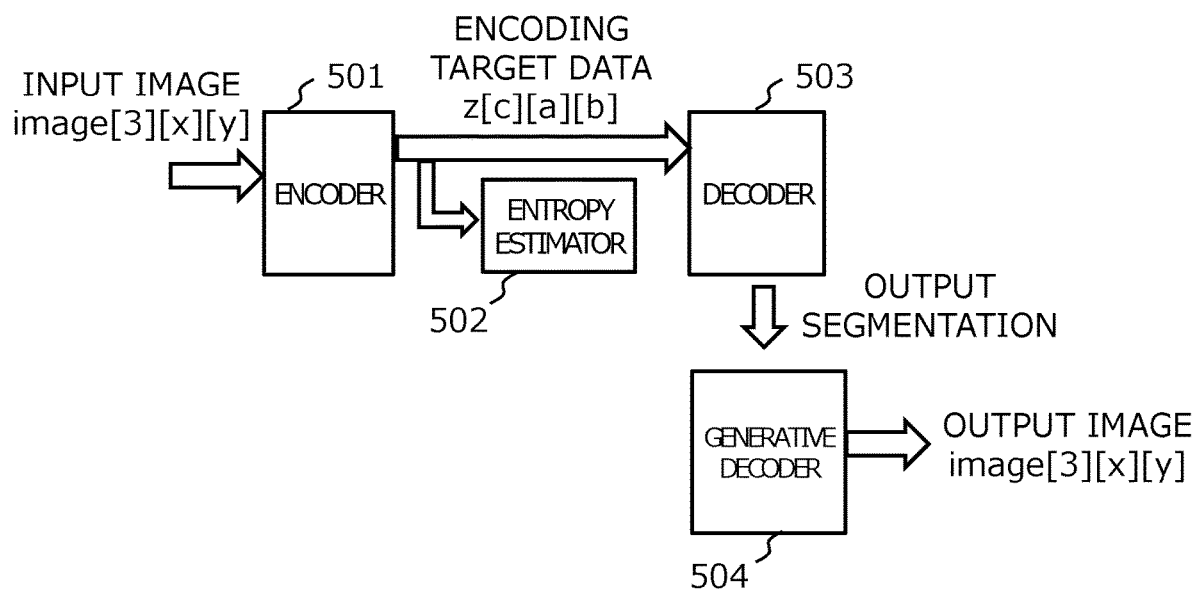
FIG. 17 is a diagram illustrating an example configuration of the data storage section according to a fourth embodiment of the present disclosure.

FIG. 17 is a diagram illustrating a configuration of the segmentation section 102 and data storage section 104 included in the information compression system according to a fourth embodiment of the present disclosure. In the example of FIG. 17, the sensor data does not include the point cloud data. Further, the segmentation section 102 and the data storage section 104 are integrally formed.

The segmentation section 102 and the data storage section 104 include an encoder 501, an entropy estimator 502, and a decoder 503 as compression processing components, and include a generative decoder 504 as a decompression processing component.

The encoder 501 converts an input image (image[3] [x] [y]), namely, the color camera data, to encoded data (z[c] [a] [b]) by encoding and compressing the input image through irreversible conversion. The encoded data is, for example, the feature value map.

The entropy estimator 502 estimates the entropy (probability distribution) of the encoded data generated by the encoder 501, and performs an entropy encoding process and an entropy decoding process in a manner similar to FIG. 12.

The decoder 503 generates output segmentation data (seg[2] [x] [y]), namely, the compressed binary data, by decoding the encoded data generated by the encoder 501.

The encoder 501 and the decoder 503 are built by a learned model based on the use of the DNN such as the CNN. For building a learned model by machine learning, for example, end-to-end learning of both the segmentation section 102 and the data storage section 104 is used. As a loss function for learning, for example, "Loss=λ*entropy+distortion (seg data, training seg data)" is used. Here, λ is a parameter for determining rate-distortion trade-off, and "entropy" is the entropy (the amount of information) calculated by the entropy estimator 502. Further, the seg data is the output segmentation data, and the training seg data is training data for the output segmentation data. A distortion function is, for example, typically a general loss function for segmentation such as cross entropy or a mean squared error (MSE). Alternatively, for example, a differentiable image quality index regarding images, such as a multi-scale structural similarity (MS-SSIM) index, may be used.

The generative decoder 504 generates output image data (image[3] [x] [y]), which includes color information as the decompressed data, by decoding the output segmentation data. The generative decoder 504 is built, for example, by a DNN-based model that is learned by a generative adversarial network (GAN). The generative decoder 504 may be built by learning that is different from learning for generating the encoder 501 and the decoder 503.

As described above, according to the present embodiment, the segmentation section 102 and the data storage section 104 are integrally built by a learned model. Therefore, the configuration of the information compression system can be simplified. Further, as the present embodiment outputs the image data to which the color information is attached by decompression processing, for example, data analysis can be made by using an application program that is in the same format as conventional application programs.

Fifth Embodiment

Figure 18:
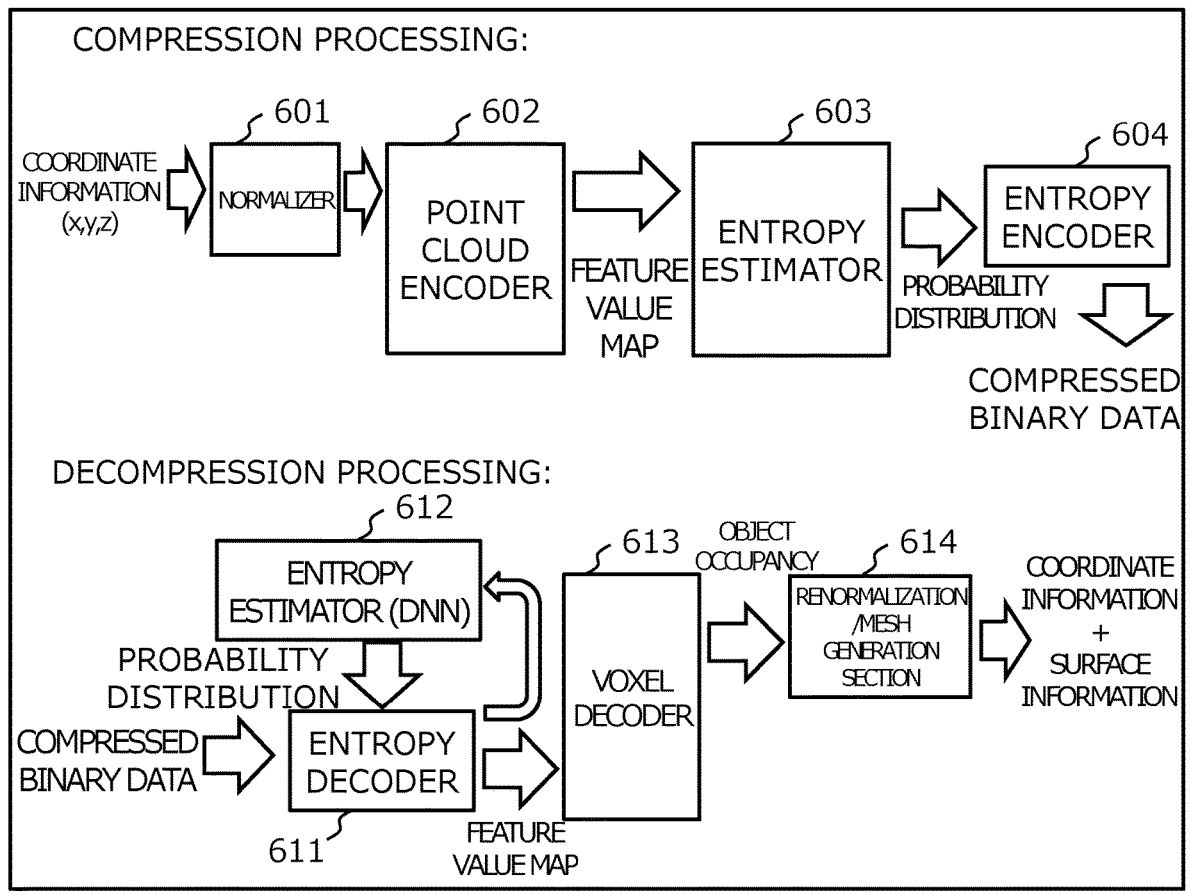
FIG. 18 is a diagram illustrating an example configuration of the data storage section according to a fifth embodiment of the present disclosure.

FIG. 18 is a diagram illustrating a configuration of the data storage section 104 included in the information compression system according to a fifth embodiment of the present disclosure. The data storage section 104 depicted in FIG. 18 includes a normalizer 601, a point cloud encoder 602, an entropy estimator 603, and an entropy encoder 604 as compression processing components, and includes an entropy decoder 611, an entropy estimator 612, a voxel decoder 613, and a renormalization/mesh generation section 614 as decompression processing components.

In the present embodiment, the chunk data is configured on the basis of individual pieces of identification information for the purpose of compressing the coordinate information. Therefore, the identification information is retained as one of items of the chunk information 60.

The normalizer 601 normalizes the coordinate information. The point cloud encoder 602 generates the feature value map by encoding and quantizing the normalized coordinate information. The feature value map is a data array that has a predetermined size and values converted to integers by quantization. The point cloud encoder 602 is built, for example, by a DNN having a combination of a multilayer perceptron (MLP) and a max-pooling layer.

The entropy estimator 603 estimates the probability distribution as the entropy of the feature value map generated by the point cloud encoder 602. The entropy estimator 603 is built, for example, by a learned model based on the use of the DNN such as a multilayer one-dimensional convolutional neural network.

The entropy encoder 604 generates the compressed binary data by encoding the feature value map according to the probability distribution estimated by the entropy estimator 603.

Further, in the decompression processing, the entropy decoder 611 generates the feature value map by decoding the compressed binary data. Specifically, the entropy decoder 611 generates the feature value map by using the entropy estimator 612. More specifically, the entropy decoder 611 predicts the probability distribution of values (symbols) in the feature value map by using the entropy estimator 612, and the entropy decoder 611 uses the compressed binary data and the predicted probability distribution to decode the symbols, and eventually performs decoding to generate the feature value map.

The voxel decoder 613 decodes the feature value map, which is generated by the entropy decoder 611, on the basis of individual three-dimensional regions designated as the voxels, and generates occupancy information indicating occupancy of an imaging target object in the individual regions designated as the voxels. Unlike the point cloud, which generally contains the position information regarding only the surface of an imaged object, the value of occupancy is close to 1 in a region inside the imaged object and close to 0 in a region outside the imaged object. Using voxelized occupancy data makes it possible to obtain a mesh close to an original object. By utilizing such characteristics and additionally using entropy encoding, it is possible to accurately store information regarding the imaged object with a smaller amount of data. The voxel decoder 613 is built, for example, by a learned model based on the use of the DNN having the MLP.

The renormalization/mesh generation section 614 generates the coordinate information and surface information by renormalizing and meshing the occupancy information. The surface information indicates a surface that is expressed by a set of three or more points indicated by the coordinate information. Meshing is performed by using, for example, a marching cubes method.

As described above, according to the present embodiment, the coordinate information is compressed on the basis of individual pieces of identification information. Further, according to the present embodiment, mesh information can be obtained by decoding the compressed binary data. Therefore, the mesh data can efficiently be read out from the data usage section 106 without waste and without going through the data conversion section 105.

The foregoing embodiments of the present disclosure are illustrative and not restrictive of the present disclosure. It is to be understood that the scope of the present disclosure is not limited to the foregoing embodiments. A person skilled in the art is able to carry out the present disclosure in various different modes without departing from the scope of the present disclosure.

What is claimed is:

1. An information compression system that compresses data, the information compression system comprising:
 a processor configured to:
 acquire point cloud data that includes a plurality of pieces of coordinate information indicating individual positions of a surface of an object;
 determine whether an object exists at a position indicated by the coordinate information;
 generate integrated data, as compression target data, according to the point cloud data and results of the determination, the integrated data including the coordinate information regarding each position of the surface of the object and identification information identifying the object existing at the position indicated by the coordinate information; and
 compress the compression target data.

2. The information compression system according to claim 1, wherein the processor acquires the point cloud data from the data.

3. The information compression system according to claim 1, wherein the processor converts the compression target data to data that is obtained by normalizing and quantizing the coordinate information included in the compression target data, and compresses resulting converted data.

4. The information compression system according to claim 1, wherein the processor converts the compression target data to data that is obtained by replacing values representing individual pieces of identification information included in the compression target data according to the object and similarity of sense, and compresses resulting converted data.

5. The information compression system according to claim 1, wherein the processor converts the compression target data to list format data that is obtained by arranging values representing the coordinate information and color-indicating values generated from individual pieces of identification information included in the compression target data, and compresses resulting converted data.

6. The information compression system according to claim 1, wherein the processor converts the compression target data to three-dimensionally arrayed data that has values of the identification information as values of individual elements, and compresses resulting converted data.

7. The information compression system according to claim 1, wherein the processor is integrally built by a learned model.

8. The information compression system according to claim 1, wherein the processor compresses coordinate information included in the compression target data on a basis of the individual pieces of identification information.

9. The information compression system according to claim 1, further comprising:
 a decompression section that generates decompressed data by decompressing the compressed data; and
 a processing section that processes the decompressed data and outputs resulting processed data.

10. The information compression system according to claim 9, further comprising:
 a data usage section that provides an interface for designating at least either a space where or a time when the data is acquired,
 wherein the decompression section decompresses the compressed data according to the designation made by the interface.

11. An information compression method that is used by an information compression system for compressing data, the information compression method comprising:

acquiring point cloud data that includes a plurality of pieces of coordinate information indicating individual positions of a surface of an object;

determining whether an object exists at a position indicated by the coordinate information;

generating integrated data, as compression target data, according to the point cloud data and results of the determination, the integrated data including the coordinate information regarding each position of the surface of the object and identification information identifying the object existing at the position indicated by the coordinate information; and generating compressed data by compressing the compression target data.

12. The information compression method according to claim 11, wherein the generating compressed data includes converting the compression target data to data that is obtained by normalizing and quantizing the coordinate information included in the compression target data, and compressing resulting converted data.

13. The information compression method according to claim 11, wherein the generating compressed data includes converting the compression target data to data that is obtained by replacing values representing individual pieces of identification information included in the compression target data according to the object and similarity of sense, and compressing resulting converted data.

14. The information compression method according to claim 11, wherein generating compressed data includes converting the compression target data to list format data that is obtained by arranging values representing the coordinate information and color-indicating values generated from individual pieces of identification information included in the compression target data, and compressing resulting converted data.

* * * * *